(12) United States Patent
Fuetsch et al.

(10) Patent No.: US 11,290,764 B2
(45) Date of Patent: Mar. 29, 2022

(54) MEDIA CONTENT DISTRIBUTION SYSTEM AND METHODS FOR USE THEREWITH

(71) Applicant: AT&T Intellectual Property I, L.P., Atlanta, GA (US)

(72) Inventors: Andre Fuetsch, Dallas, TX (US); Robert Koch, Norcross, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/854,243

(22) Filed: Apr. 21, 2020

(65) Prior Publication Data

US 2020/0252673 A1 Aug. 6, 2020

Related U.S. Application Data

(63) Continuation of application No. 15/907,697, filed on Feb. 28, 2018, now Pat. No. 10,674,197.

(51) Int. Cl.
*H04N 21/266* (2011.01)
*H04L 67/50* (2022.01)
*H04N 21/466* (2011.01)
*H04N 21/442* (2011.01)
*H04N 21/2665* (2011.01)

(52) U.S. Cl.
CPC ....... *H04N 21/26603* (2013.01); *H04L 67/22* (2013.01); *H04N 21/2665* (2013.01); *H04N 21/44218* (2013.01); *H04N 21/4667* (2013.01)

(58) Field of Classification Search
None
See application file for complete search history.

(56) References Cited

U.S. PATENT DOCUMENTS

| | | |
|---|---|---|
| 9,148,706 B1 | 9/2015 | Shin |
| 9,215,502 B1 | 12/2015 | Sherrets et al. |
| 9,277,258 B2 | 3/2016 | Oztaskent et al. |
| 9,635,398 B2 | 4/2017 | Ionescu et al. |
| 9,792,285 B2 | 6/2017 | Reiley et al. |
| 2005/0028194 A1 | 2/2005 | Elenbaas et al. |
| 2005/0193015 A1 | 9/2005 | Logston et al. |
| 2006/0117040 A1 | 6/2006 | Begeja et al. |
| 2007/0033531 A1 | 2/2007 | Marsh et al. |
| 2008/0040301 A1* | 2/2008 | Sadagopan ............ G06Q 30/02 706/16 |
| 2008/0126961 A1* | 5/2008 | Naaman .............. G06F 16/9537 715/764 |
| 2008/0228749 A1 | 9/2008 | Brown |
| 2009/0024559 A1* | 1/2009 | Arrasvuori .............. G06F 16/58 |

(Continued)

*Primary Examiner* — Alexander Q Huerta
(74) *Attorney, Agent, or Firm* — Guntin & Gust, PLC; Kenneth Kwan

(57) ABSTRACT

Aspects of the subject disclosure may include, for example, a device configured for generating a number of content groups by grouping a number of tagged media segments according to their corresponding content designators. The device can be further configured for detect an activity of a user, determining a particular segment length and content designator according to the detected activity, and generating a selected content group according to the particular segment length and content designator. A content group is selected according to the particular segment length and the content designator. Other embodiments are disclosed.

20 Claims, 8 Drawing Sheets

(56) References Cited

U.S. PATENT DOCUMENTS

| | | |
|---|---|---|
| 2009/0328103 A1 | 12/2009 | Morris et al. |
| 2010/0262658 A1* | 10/2010 | Mesnage ............... G06Q 10/10 709/204 |
| 2011/0320380 A1 | 12/2011 | Zahn et al. |
| 2012/0159337 A1 | 6/2012 | Travilla et al. |
| 2012/0290434 A1* | 11/2012 | Moritz ............... G06Q 30/0261 705/26.7 |
| 2013/0308921 A1 | 11/2013 | Budzinski |
| 2013/0325869 A1 | 12/2013 | Reiley et al. |
| 2014/0136554 A1 | 5/2014 | Moradi et al. |
| 2015/0058873 A1* | 2/2015 | Newell ................ H04N 21/251 725/14 |
| 2015/0081695 A1 | 3/2015 | Schillings et al. |
| 2015/0088423 A1* | 3/2015 | Tuukkanen ........... G06F 3/0482 701/538 |
| 2016/0007069 A1* | 1/2016 | Krechman ....... H04N 21/41407 725/32 |
| 2016/0285982 A1* | 9/2016 | Abercrombie, III .... H04L 51/32 |
| 2016/0295260 A1 | 10/2016 | Qu et al. |
| 2017/0031907 A1 | 2/2017 | Juang et al. |
| 2017/0171623 A1 | 6/2017 | Peterson |
| 2017/0358022 A1* | 12/2017 | Deak .................... H04W 4/027 |
| 2018/0035254 A1* | 2/2018 | Zhang .................. H04L 67/306 |
| 2018/0184133 A1 | 6/2018 | Shaw et al. |
| 2019/0149879 A1* | 5/2019 | Siddiq ............. H04N 21/44222 725/14 |
| 2019/0268645 A1 | 8/2019 | Fuetsch et al. |

\* cited by examiner

MEDIA CONTENT DISTRIBUTION SYSTEM AND METHODS FOR USE THEREWITH

CROSS REFERENCE TO RELATED APPLICATIONS

This application is a continuation of U.S. patent application Ser. No. 15/907,697 filed on Feb. 28, 2018. The contents of each of the foregoing is/are hereby incorporated by reference into this application as if set forth herein in full.

FIELD OF THE DISCLOSURE

The subject disclosure relates to network elements in a communication network.

BACKGROUND

As smart phones, tablets, computers, set-top boxes, and other communication devices increasingly become ubiquitous, and data usage increases, managing the distribution of media content to users of such devices becomes more challenging.

BRIEF DESCRIPTION OF THE DRAWINGS

Reference will now be made to the accompanying drawings, which are not necessarily drawn to scale, and wherein.

DETAILED DESCRIPTION

Figure 1:
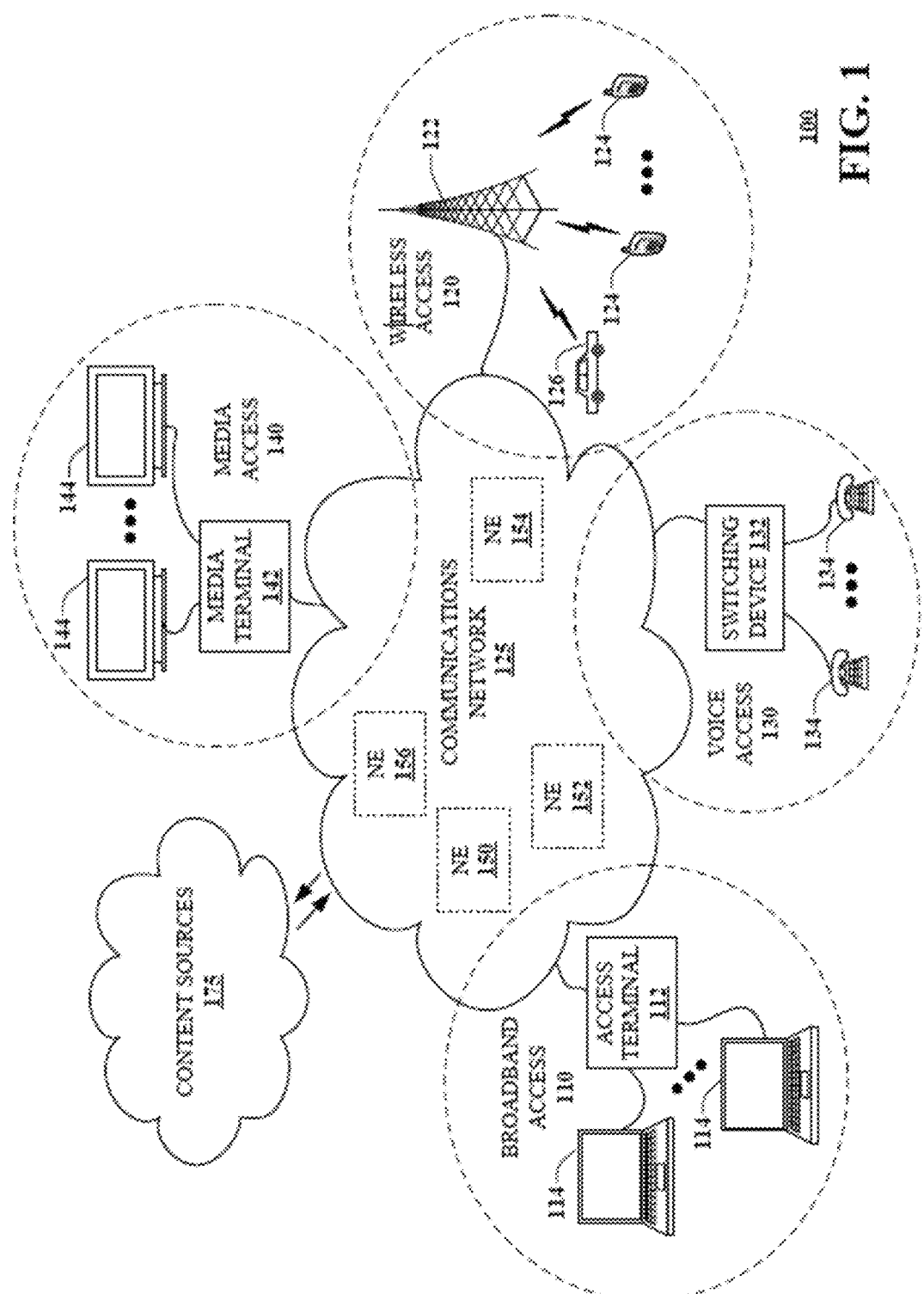
FIG. 1 is a block diagram illustrating an example, non-limiting embodiment of a communications network in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In accordance with one or more embodiments, a device can include a processing system including a processor, and a memory that stores executable instructions that, when executed by the processing system, facilitate performance of operations. The operations performed by the processing system can include receiving a plurality of segments of media content from a plurality of media content sources, generating a plurality of tagged media segments by tagging each of the plurality of segments of media content according to one of a plurality of content designators, generating a plurality of content groups by grouping the plurality of tagged media segments according to a plurality of segment sizes and their corresponding content designators, and generating data based on data received from at least one of a plurality of devices that monitor activities of a user. The operations can further include detecting an activity of the user according to at least a portion of the data, generating a selected content group by selecting a content group from the plurality of content groups according to the activity detected, selecting a target communication device to present to the user a message associated with the selected content group, and transmitting information associated with the message to the target communication device.

In accordance with one or more embodiments, a machine-readable medium, can have executable instructions that, when executed by a processing system including a processor, facilitate performance of operations. The operations performed by the processing system can include obtaining a plurality of segments of media content, generating a plurality of tagged segments by tagging each of the plurality of segments of media content according to one of a plurality of content designators, generating a plurality of content groups by grouping the plurality of tagged segments according to a plurality of segment sizes and their corresponding content designators, and obtaining data from data provided by each of a plurality of devices obtaining data associated with activities of a user, wherein at least a portion of the data is related to an activity of the user. The operations can further include detecting an activity of the user according to the at least the portion of the data, generating, according to the activity, a selected content group by selecting a content group from the plurality of content groups, and transmitting to a target communication device a notification associated with the selected content group.

In accordance with one or more embodiments, a method can be used for obtaining, by a processing system including a processor, a plurality of segments of media content, generating, by the processing system, a plurality of tagged media segments by tagging each of the plurality of segments of media content according to one of a plurality of content designators, and generating, by the processing system, a plurality of content groups by grouping the plurality of tagged media segments according to their corresponding content designators. The method can further include identifying, by the processing system, an activity of a user according to activity data collected from at least one device, generating, by the processing system according to the activity of the user, a selected content group by selecting a content group from the plurality of content groups, and transmitting, by the processing system, to a target communication device a notification associated with the selected content group.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
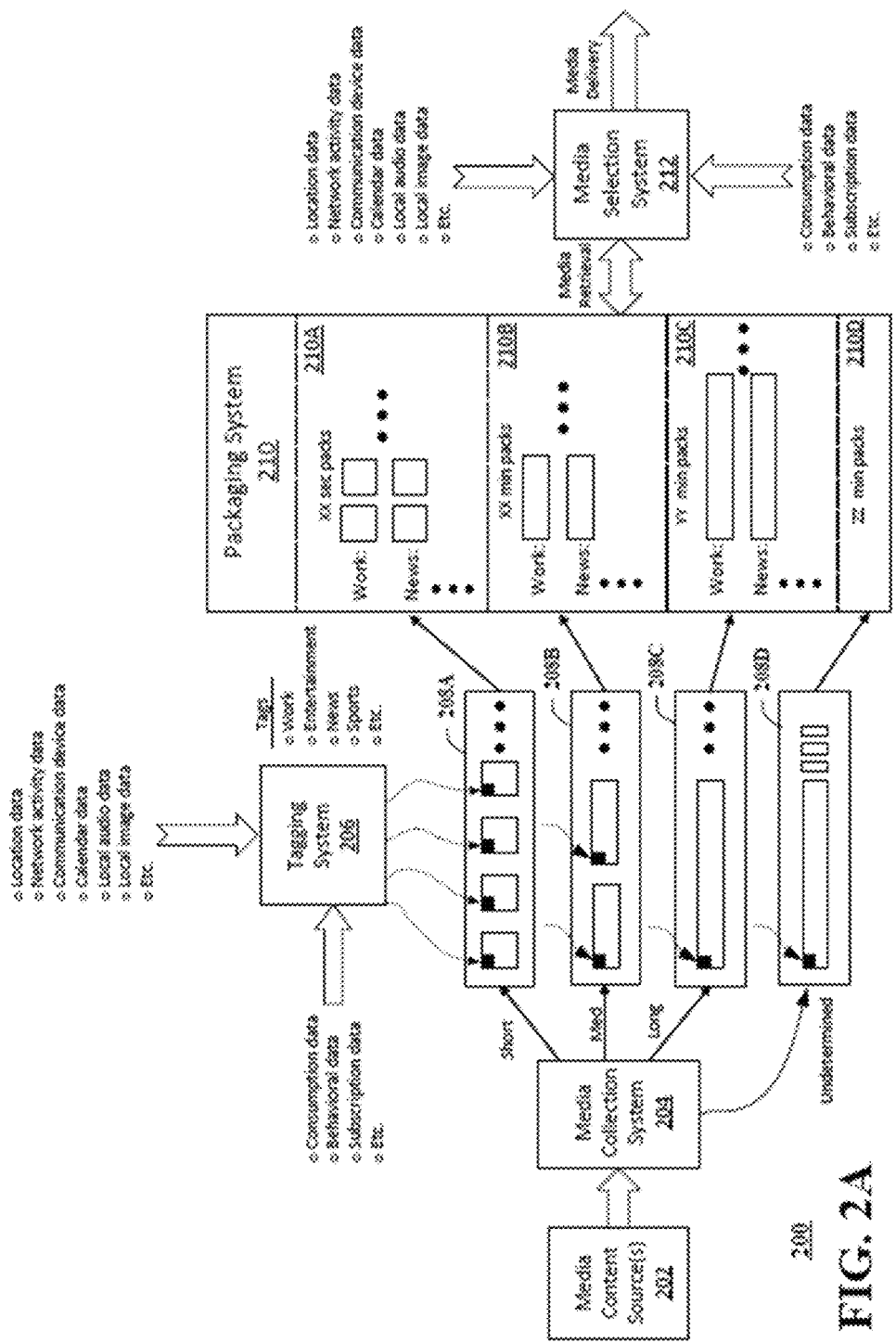
FIG. 2A is a block diagram illustrating an example, non-limiting embodiment of a system functioning within the communication network of FIG. 1 for distributing media content in accordance with various aspects described herein.

Turning now to FIG. 2A, a block diagram is shown illustrating an example, non-limiting embodiment of a system 200 operating within one or more subsystems of the communication network 100 of FIG. 1 for distributing media content in accordance with various aspects described herein. FIG. 2A depicts media content source(s) 202, which supply segments of media content to a media collection system 204. The segments of media content supplied by the media content sources 202 can include without limitation audio content, video content, still image content, textual content, augmented reality content, virtual reality content, or any combinations thereof. The audio content can include among other things content provided by a radio station, music content from a user's library, audio books read to the user, or other suitable sources of audio content. The video content can include among other things scheduled broadcast media content (e.g., broadcast television), on-demand media content (e.g., on-demand TV shows, movies, etc.), video content from a user's library (e.g., vacation videos, social media videos, etc.), recorded video content (e.g., video content recorded by a digital video recorder), video games, or other suitable forms of video content. Still image content can include among other things images from a user's personal library (e.g., photo album), images from a news feed, or other suitable still image content. Textual content can include among other things e-books, news outlets, journal articles, or other suitable textual content.

In one or more embodiments, augmented reality content can be superimposed on a display of a computing device, reading glasses or other suitable presentation devices to augment a user's experience. Augmented reality content can be used, for example, while a user tours a historic sight (e.g., user points a smartphone at a historic sight with the camera feature enabled, while augmented reality content is superimposed to show what the historic site would have looked like at an earlier time). Augmented reality content can also be used to enhance viewing of scientific data, to enhance a navigation display while traveling, to enhance viewing of a patient's scans, and other suitable applications. In one or more embodiments, virtual reality content can be used in a video gaming application, in a work environment to provide an expansive desktop setting, to enhance remote communications between individuals to enable them to partake in a shared virtual environment, and so on.

The segments of media content supplied by media content sources 202 can be polled periodically by the media collection system 204 based on a profile of a user that identifies user preferences, demographic and psychographic information about the user, subscription information that identifies content sources the user has subscribed to, behavioral information that identifies the media content consumption habits of the user on an hourly, day-to-day, week-to-week, or month-to-month basis, and so on. The segments of media content supplied by media content sources 202 can also include real-time searches performed by a user, or media content feeds configured by the user (e.g., a web or RSS feed from a news outlet, technical journal organization, financial institution, etc.). In various embodiments, the segments of media content supplied by media content sources 202 can be triggered by a preconfigured arrangement established by a user, a polling technique used by the media collection system 204 based a user's profile information, or a combination thereof.

The segments of media content supplied by the media content sources 202 can be organized by the media collection system 204 by a length of the media segment (e.g., size in bytes, duration, or both). For example, the media collection system 204 can organize segments into short media segments 208A (e.g., less than 5 minutes), medium media segments 208B (e.g., between 5 and 15 minutes), long media segments 208C (greater than 15 minutes), and media segments of undetermined length 208D (e.g., RSS-feed). A tagging system 206 can be used to tag each segment of media content with a designator. The designator can identify the media segment with a work-related tag, entertainment tag, news tag, sports tag, or other tags that identify the segment according to a unique media content type. In various embodiments, the tagging system 206 can select a tag based on an identification of the media source (e.g., news source, entertainment source, etc.). In other embodiments, the tagging system 206 can select a tag responsive to analyzing the media segment using image processing techniques, audio processing techniques, textual processing techniques, or any combinations thereof. For example, the tagging system 206 can recognize from audio and/or image data that the media segment relates to news content, entertainment content, or otherwise, and from such information, can thereby select and tag the segment of media content accordingly.

To further enhance the tag selection process, the tagging system 206 can be configured to receive aggregate data, which can correspond to data collected in association with activities of a user. The collected data can include among other things location data, network activity data, communication device data, calendar data, local audio data, local image data, consumption data, behavioral data, subscription data, or other suitable sources of data that can be analyzed and processed to determine activities, interests, availability or other relevant information about the user. The foregoing data types can be supplied by any number of the subsystems of the communication network 100 and/or system 200 of FIGS. 1 and 2A. The subsystems of the communication network 100 can include without limitation the access terminal 112, the switching device 132, the network elements 150-156, the wireless access point 122, and/or the media terminal 142. The subsystems of system 200 can include without limitation the media content sources 202, the media collection system 204, the media the tagging system 206, the packaging system 210, and/or the media selection system 212.

To protect the user's privacy, the user can be presented (at a communication device utilized by the user) with an opt-in or opt-out service option provided by the communication network 100 and/or system 200. A selection by the user to opt-in to the services of system 200 enables any subsystems of system 200 to collect and analyze data generated by subsystems of the communication network 100 and/or the subsystems of system 200, and/or by communication devices utilized by the user that are communicatively coupled to the communication network 100 and/or system 200. If the user chooses in whole or in part to opt-out of the services of system 200, subsystems of the communication network 100, and/or the subsystems of system 200, and/or communication devices utilized by the user can be configured accordingly to maintain data associated with the user's activities private.

Assuming the user has opt-in to the services of system 200, the location data obtained from the aggregate data can be obtained, for example, from a location services server (not shown) that tracks the location of the user by way of GPS data supplied by a communication device utilized by the user. Such data can enable the tagging system 206 to identify patterns (routines) of the user, which can be used to identify a work schedule, exercise schedule, entertainment routines, and so on. The network activity data can be provided by, for example, the network elements 150-156 of communication network 100 illustrated in FIG. 1. Network activity data can indicate which activities a user is engaged in and when such activities occur by analyzing the flow and type of data transported by the one or more of the network elements 150-156 of FIG. 1.

Communication device data can include data supplied by a communication device utilized by the user (e.g., smartphone, tablet, phablet, computer, set-top box, etc.). The communication device data can include among other things orientation data (e.g., 3D orientation of a display of the communication device), trajectory data (e.g., motion data supplied by an accelerometer, gyroscope, and/or magnetometer), media content consumed at the communication device by the user, media content stored at the communication device, media and/or communication services most initiated by the communication device based on user-generated input (tactile, audio) supplied by the user, and so on.

Calendar data can be supplied by a communication device utilized by the user or an email server. Calendar data can indicate planned activities/events, which can be work-related, entertainment, or otherwise. The content included in a calendar notice can also be useful in identifying whether the planned activity is work-related or personal. Although not mentioned, aggregate data can also include text messages, email data and contacts data. The email data can include email messages generated by the user, or received by the user. The contacts data can include an address book that lists user contact information (e.g., name, title, company, email address, phone numbers, etc.). Text messages can be supplied by a mobile communication device utilized by the user and/or from a social network website. Email data, contact data, and text messages can be further analyzed in combination with the calendar data to identify planned activities/events that the user is or will be engaged in.

Local audio and/or image data obtained from a communication device utilized by the user can be analyzed by one or more subsystems of system 200 using audio, image, and/or textual recognition techniques to identify the activities and interests of the user. Similarly, consumption data (e.g., TV shows watched by the user, movies rented or purchased, music purchased or heard via a music service subscription, audio e-books purchased, or other online goods or services purchased by the user) can identify patterns of the user.

Behavioral data gathered or supplied by a system not shown (or generated by the tagging system 206 from the aggregate data) can provide a systematic technique for tagging segments of media content based on a relevance to the user's day-to-day activities. Behavioral data can identify day-to-day routines of a user (e.g., exercise routine, work routine, entertainment routine, and so on), and a type of media content consumed during each routine. Subscription data can identify services available to the user for media consumption.

The collection of location data, network activity data, communication device data, calendar data, local audio/image data, consumption data, behavioral data, subscription data, and/or other suitable data types can be used to identify a user's activities, consumption behaviors, and/or routines. The tagging system 206 can use such data in whole or in part to selectively tag segments of media content having short, medium, long, and undetermined lengths according to a work tag, an entertainment tag, a news tag, sports tag, and so on. The tag can be a unique header attached to the media content that designates a type of content. Alternatively, the tag information can be included in metadata associated with the segment of media content.

Once the media segments have been collected and organized by the media collection system 204 according to their length (e.g., size and/or duration), and labeled by the tagging system 206 with a corresponding tag, a packaging system 210 can be configured to organize the media segments into content groups based on their length and corresponding tags. For example, the packaging system 210 can generate a first content group 210A comprised of short segments organized according to their corresponding tags (work, news, etc.) as shown in FIG. 2A. Similarly, the packaging system 210 can generate a second content group 210B comprised of medium segments organized according to their corresponding tags, a third content group 210C comprised of long segments organized according to their corresponding tags, a fourth content group 210D comprised of indeterminate length segments organized according to their corresponding tags, and so on.

A media selection system 212 can be configured to monitor activities of a user, and responsive to a detected activity, select media content from the packaging system 210 that is appropriate for the detected activity, and determine an appropriate time to deliver the selected media content. This can be accomplished by configuring the media selection system 212 to analyze in whole or in part the aggregate data referred to earlier. For example, location data can indicate that the user is at a work place. Calendar data can indicate that the user is about to engage in a meeting relating to topic X that has a short duration (e.g., 30 mins), and which will be attended by a small group of participants (e.g., 3 individuals inclusive of the user). Since the meeting is of a short duration, the media selection system 212 can be configured, for example, to explore the content groups 210A to find media content that may relates to topic X. If there is a match, the media selection system 212 can submit a request to the packaging system 210 for a copy of the media segment(s) related to topic X.

The media selection system 212 can further determine from the aggregate data which communication device would most likely be in use by the user before and during the meeting. For example, the aggregate data may indicate that the user is carrying a smartphone, and a laptop based on GPS data from either device or other suitable presence data supplied by these devices to system 200. Once a target communication device is identified, the media selection system 212 can proceed to transmit a notification message to the target communication device, which can be delivered by a small message service (SMS) or multimedia messaging service (MMS).

Figure 2B:
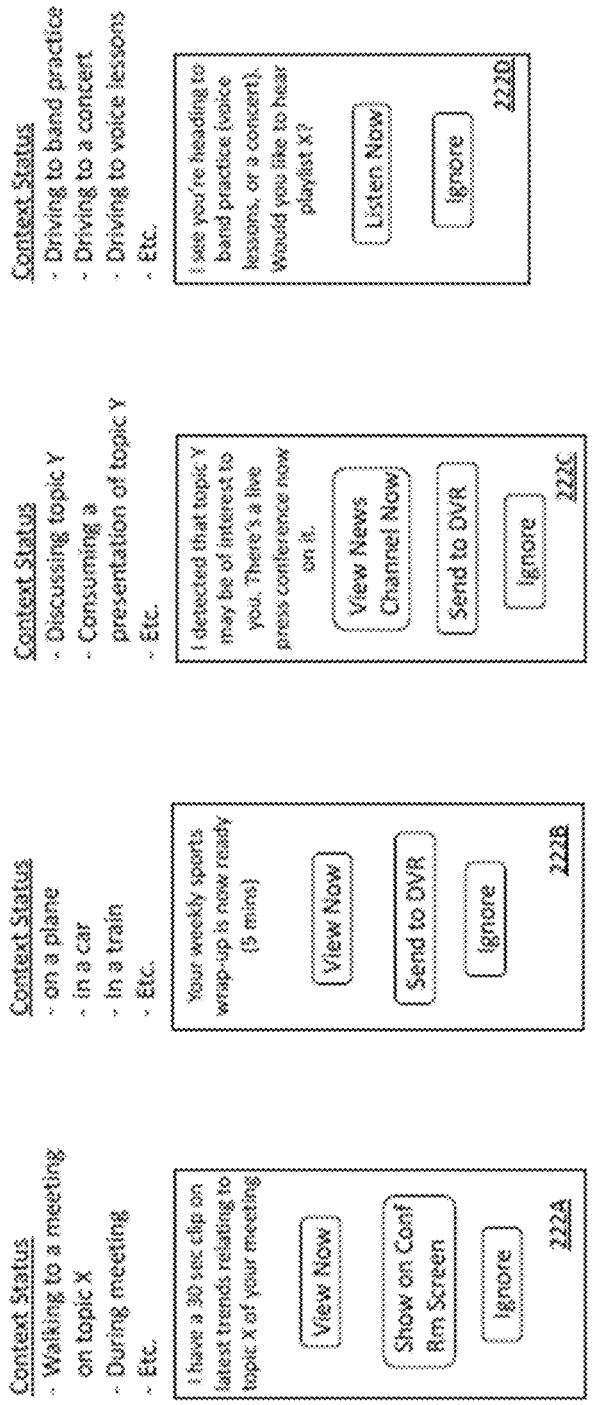
FIG. 2B is a block diagram illustrating example, non-limiting embodiments of prompts presentable at a communication device communicatively coupled to the system of FIG. 2A in accordance with various aspects described herein.

In one embodiment, the notification message can serve, for example, as a prompt, such as prompt 222A depicted in FIG. 2B. The prompt can provide to the user an option to immediately view on a display of the target communication device the media segment(s) related to topic X responsive to, for example, selection of a "View Now" button in the prompt (or responsive to an audible command from the user). Alternatively, the user can choose to present the media segment(s) related to topic X on a conference room screen responsive to selecting a "Show on Conf Rm Screen" button in the prompt (or responsive to an audible command from the user). If either of these options is selected by the user, the media selection system 212 can stream the media segment(s) related to topic X either on the display of the target communication device or the conference room screen depending on which button (or audible command) is provided by the user. Alternatively, the user can also choose to ignore the media segment(s) related to topic X responsive to selecting an "Ignore" button in the prompt (or responsive to an audible command from the user).

FIG. 2B illustrates, additional non-limiting embodiments of prompts 220 presentable at a communication device communicatively coupled to the system 200 of FIG. 2A in accordance with various aspects described herein. For example, the media selection system 212 can be configured to detect based on location data that the user is on a plane, car, train or other mode of transportation, and that while in transit the user is not presently engaged in business activities, which may be determined from the calendar data (e.g., in transit to a vacation destination) or network activities generated by a communication device of the user (e.g., browsing the internet on general matters). In this instance, the media selection system 212 can search for topics that may interest the user such as sports. Depending on the expected travel time of the user, which may also be determined by the media selection system 212 from, for example, an intended destination derived from the calendar data, the media selection system 212 can determine an appropriate length of media segments that may be suitable to the user's interest and availability while s/he is in transit. With this information, the media selection system 212 may, for example, submit a search request to the packaging system 210 for media segments associated with a sports wrap-up that does not exceed the transit time of the user (e.g., 5 mins). Once found, the media selection system 212 can transmit a notification message to a select target communication device utilized by the user. The notification message can include a prompt similar to prompt 222B depicted in FIG. 2B. In this illustration, the user has the option to immediately view the weekly sports wrap-up, request a recording of the sports wrap-up via a DVR (e.g., set-top box DVR or cloud DVR), or simply ignore it.

On other occasions the media selection system 212 may detect from local audio data supplied by a communication device utilized by the user a conversation with another individual. Utilizing audio processing technology that, for example, converts audible signals to text, the media selection system 212 can process the text and determine that the conversation relates to topic Y (e.g., state politics, congressional politics, international news, etc.). Depending on the location and activity of the user, the media selection system 212 may determine, for example, that the user may be interested in viewing media content relating to topic Y for an indeterminate length of time. Suppose the media selection system 212 submits a search request to the packaging system 210 for media segments associated with topic Y, and finds an on-going broadcast of an indeterminate length (e.g., live news cast). Once found, the media selection system 212 can transmit a notification message to a select target communication device utilized by user. The notification message can include a prompt similar to prompt 222C depicted in FIG. 2B. In this illustration, the user has the option of immediately viewing the news channel, requesting that the news content be recorded in a DVR (e.g., set-top box DVR or cloud DVR), or simply ignore it.

In yet another embodiment, the media selection system 212 may detect from calendar data and location data that the user is in transit to an event relating to music content (e.g., driving to band practice, driving to a concert, driving to voice lessons, etc.). The media selection system 212 may determine, for example, that the user may be interested in listening to audible media content from a library of playlists created by the user, or generated dynamically on behalf for the user by one of the subsystems of system 200 of FIG. 2A, which in either case is associated with the event in question (e.g., band practice, concert, or voice lessons). The media selection system 212 can further determine an expected time of travel based on a known destination of the user, and traffic conditions. From the expected time of travel, the media selection system 212 may determine that playlists of a medium length (e.g., 15 mins) would be suitable for the user. Based on the foregoing determinations, the media selection system 212 can submit a search request to the packaging system 210 for media segments associated with playlists associated with or related to the detected event (e.g., band practice, concert, or voice lessons) that do not exceed the 15 minute transit time (e.g., a medium length segment, or multiple short length segments). Once such a playlist is found, the media selection system 212 can transmit a notification message to a select target communication device utilized by user. The notification message can include a prompt similar to prompt 222D of FIG. 2B. In this illustration, the user has the option of immediately listening to playlist X, or simply ignore it.

In instances where the media selection system 212 cannot find a match in the packaging system 210 because the length of the media segment(s) and/or the type of media content desired is not a strong match, the media selection system 212 can be configured to adapt its strategy. For example, suppose the media selection system 212 cannot find media segments related to topic X that do not exceed 15 mins, but instead finds media segments of topic X that are longer than desired. In certain embodiments, the media selection system 212 can be configured to nevertheless notify the user in case the user may have interest in the media segments even though it may not suit the user's circumstances. Similarly, there may be circumstances where the media selection system 212 cannot find media segments in the packaging system 210 that are a close match to topic X, but instead finds media segments on topic Y which has at least an ancillary relationship to topic X (e.g., topic X relates to sports team XYZ, while topic Y relates to ranking sports teams including team XYZ). In certain embodiments, the media selection system 212 can be configured to notify the user in case the user has an interest in the media segments of topic Y even though it may not directly focus on topic X.

It will be appreciated that artificial intelligence technology can be used by any of the subsystems of FIG. 2A (e.g., media content sources 202, media collection system 204, tagging system 206, packaging system 210, and/or media selection system 212) to provide a user access to an expansive collection of content of variable length and content types, and thereby avoid narrower outcomes which may arise from rigid/fixed software algorithms which don't have the adaptability of artificial intelligence.

Figure 2C:
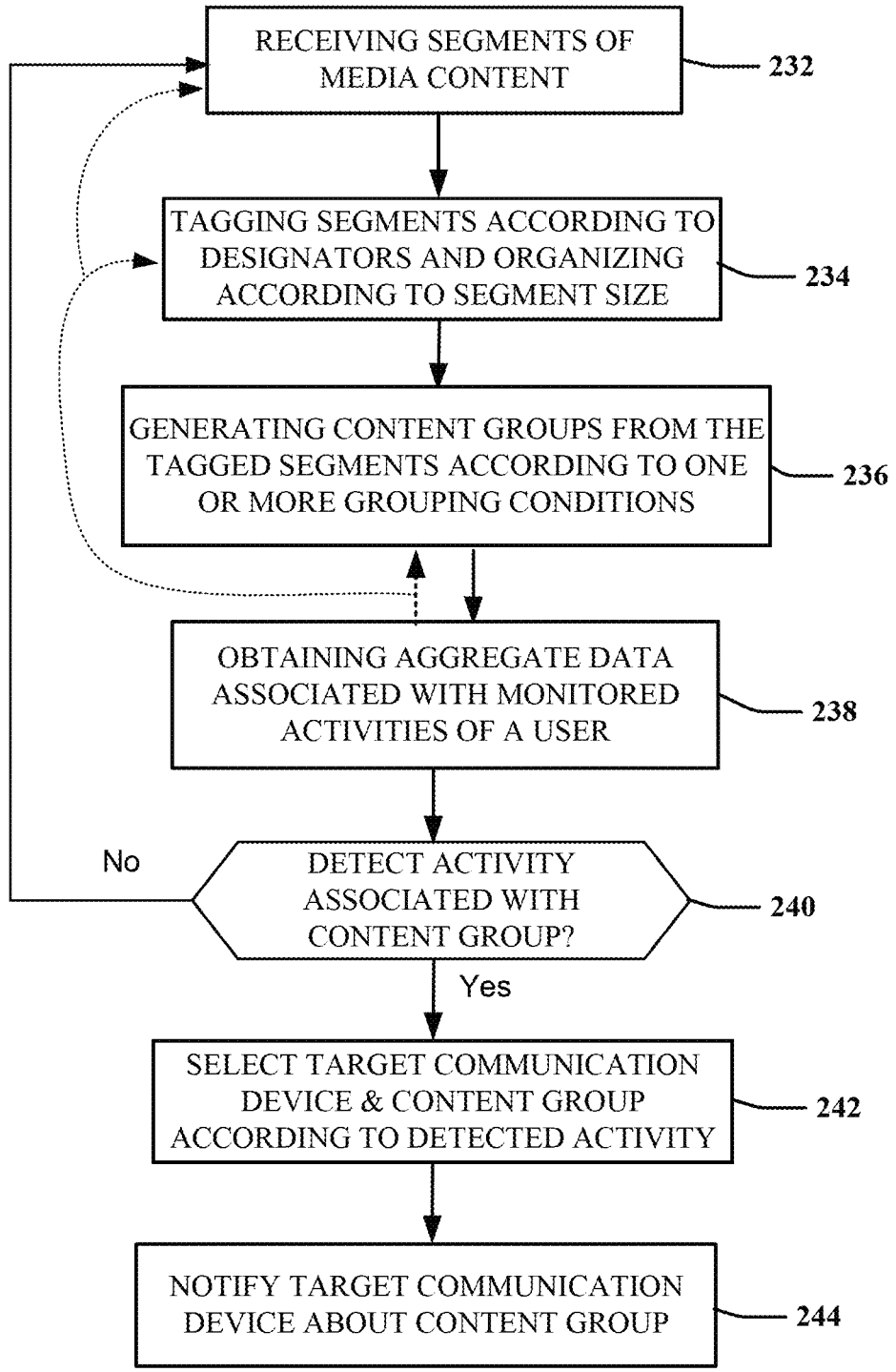
FIG. 2C illustrates a flow diagram of an example, non-limiting embodiment of a method that can be utilized by the system of FIG. 2A in accordance with various aspects described herein.

Turning now to FIG. 2C, a flow diagram is shown of an example, non-limiting embodiment of a method 230 that can be implemented in whole or in part by the subsystems of communication network 100 of FIG. 1 and/or the subsystems of system 200 of FIG. 2A in accordance with various aspects described herein. Step 232 of method 230 can begin with receiving segments of media content from one or more media content sources. Segments of media content can be received at step 232 responsive to various triggers or events, such as preconfigured polling of content, and/or monitoring real-time activities of a user. For example, the media content sources 202 and/or the media collection system 204 of FIG. 2A can be configured to search for media content based on user preferences determined from behavioral data of a user and/or preferences provided in a user profile of the user. From such configurations, system 200 can receive a steady stream of media content of different content types and lengths responsive to a continuous or periodic search for media content that is determined to be of interest to the user based on behavioral data and/or preferences obtained from the user's profile. Additionally, searches performed by the user (e.g., using a browser) can be collected by the media collection system 204, and can serve as a trigger for augmenting the search criteria utilized by the media content sources 202 and/or the media collection system 204 to find media content that may be of interest to the user.

The media content received at step 232 can be tagged at step 234 according to designators that distinguish one content type from another (e.g., work-related content, entertainment content, news-related content, sports content, etc.). A tag can be added to header information included in each segment of media content (or in at least one segment of a collection of segments), or as metadata that accompanies one or more segments of media content. In step 234, the segments of media content can be organized by their length, which can be a representation of content size (e.g., bytes), duration (e.g., seconds), or a combination thereof. At step 236, the tagged media content can be organized in content groups based on length, the designator included in each tag, or a combination thereof.

At step 238, aggregate data can be obtained and processed based on monitored activities of the user. The aggregate data can include, among other things, location data, network activity data, communication device data, calendar data, local audio data, local image data, consumption data, behavioral data, subscription data, and/or other suitable sources of data that can be analyzed and processed to determine activities, interests, availability or other relevant information about the user. Aggregate data can also be used to configure subsystems of system 200 that perform steps 232, 234 and/or 236. For instance, aggregate data can be used to analyze the user's preferences for media content, which in turn can be used to generate search queries that influence the media content received at step 232 from content sources. Similarly, aggregate data can be used to generate tags that identify work-related content, entertainment content, sports content, news content, or other content types which may be of interest to the user. This can be accomplished by analyzing a user's daily routine, which can be determined from calendar data, location data, consumption data, as well as other data types described in the subject disclosure. In one or more embodiments, the aggregate data or a portion thereof can be utilized as input into an artificial or machine-learning algorithm that is utilized for determining the user preferences.

In addition, aggregate data can also be used to generate content groups at step 236. For instance, aggregate data can be analyzed to determine the user's likely attention span during a detected activity by analyzing the user's habits and routines. For example, if the user has many meetings during a workday (e.g., detectable from calendar data), then it can be assessed that the user may have a shorter span of attention to process collateral media content versus another user who has less meetings. Since the user's habits and routines can change, step 236 can be configured to adapt to such changes. For example, if the user's attention span is detected to have increased, content groups of larger size or duration may be created to accommodate such a change. It will be further appreciated that aggregate data can be collected and analyzed based on historical patterns. As such, the aggregate data utilized in steps 232, 234, and 236 may be based on historical data generated from a correlation analysis of aggregate data over a long period of time to more accurately identify the user's patterns. Accordingly, the subsystems of system 200 that perform steps 232, 234, and 236 may be less reliant on real-time collection of data associated with the user than, for example, the media selection system 212 as will become apparent with steps 240 and 242.

At step 240, the aggregate data can be used to monitor and detect (e.g., in real-time) activities of the user. In particular, at step 240 aggregate data can be collected and evaluated in real-time so that the user's activities can be promptly detected and responded to. To avoid responding to too many activities of the user and thereby generating excessive notifications which may not be desirable, step 240 can be configured to identify activities by their expected duration, the relevance of the activity to the user, the likelihood the user will welcome notifications of media content, and/or the frequency of notifications during the day. For example, if the user is detected to be walking between offices with no apparent destination, a system performing the function of step 240 can be configured to wait until the user's activities can be more thoroughly assessed. Similarly, a system performing step 240 can be configured to compare the frequency of notifications sent to the user and compare it to a threshold which may be both temporal and quantitative (e.g., no more than xx notifications per zz minutes). It will be appreciated that step 240 can also be configured to consider other suitable criteria to limit the activities detected and the likelihood the user will welcome notifications of media content.

Once a monitored activity satisfies the aforementioned criteria at step 240, a target communication device and a content group can be selected at step 242 according the detected activity. At step 242, the content group can be selected according to the context of the activity (e.g., work-related, specific topic, type of activity, and so on). Additionally, in certain embodiments the content group selected can have a high relevance or intermediate relevance to the activity detected. In some embodiments, the level of relevance can be determined from a correlation analysis between the segments of media content in the selected content group and the detected activity. A minimum correlation threshold can be used to limit the selection of media content from the available content groups generated at step 236.

The target communication device can be any type of communication device that may be accessible to the user at the time the activity is detected (e.g., a smartphone, a tablet, a set-top box, a computer, etc.). The target communication device most likely to be in use by the user at the time the activity is detected may be determined by analyzing select portions of the aggregate data. For example, network activity data obtained from the aggregate data can be analyzed to determine which device the user may be utilizing at the time of the activity is detected. Network activity data may indicate, for instance, that the user is utilizing his/her computer at the time of the activity. Network activity data supplied by a smartphone commonly utilized by the user such as GPS data, or data from a proximity/temperature sensor that detects a proximity to the user, may be sufficient to indicate the user is carrying the smartphone at the time of the activity. Accordingly, any suitable device detection technique that identifies a communication device that may be in a possession of a user at the time of a detected activity may be utilized at step 242.

At step 244, a prompt message such as shown in FIG. 2B can be transmitted to the target communication device for presentation. The presentation can be at a display and/or via an audio system of the target communication device. The prompt message can provide the user options for processing the media content (e.g., view now, record for later consumption, or ignore). In certain embodiments, the notification message can be presented without a prompt message. For instance, suppose the user has frequently chosen a view now option. Further suppose, a subsystem of system 200 (e.g., the media selection system 212) determines there is a high likelihood the user will request a presentation of the media content. Under these circumstances, the notification transmitted to the target communication device can include a copy of segment(s) of media content in the content group selected at step 242 for immediate consumption. In one embodiment, the user can be presented a selectable icon on a display of the target communication device, which when selected by the user, initiates a presentation of the segment(s) of media content. In other embodiments, the user can provide an audible command to initiate the presentation of segment(s) of media content. In yet other embodiments, the presentation of segment(s) of media content can begin the moment the segment(s) of media content are received in full or are streamed to the target communication device.

In one or more embodiments, information can be obtained from other devices where the information is utilized to further manage content delivery for the user. For example, a context of a user's activity can be further analyzed based on data obtained from associated devices in proximity to the user. For instance, the media selection system 212 can be configured to detect based on location data that the user is on a train and that a family member is with the user based on data obtained from the family member's communication device which is part of the same subscriber agreement. In this instance, the media selection system 212 can search for topics that may interest the user as well as the family member. In another example, the selected content may be further filtered based on the detected presence of the family member, such as providing only age-appropriate content when a child is present with the user.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
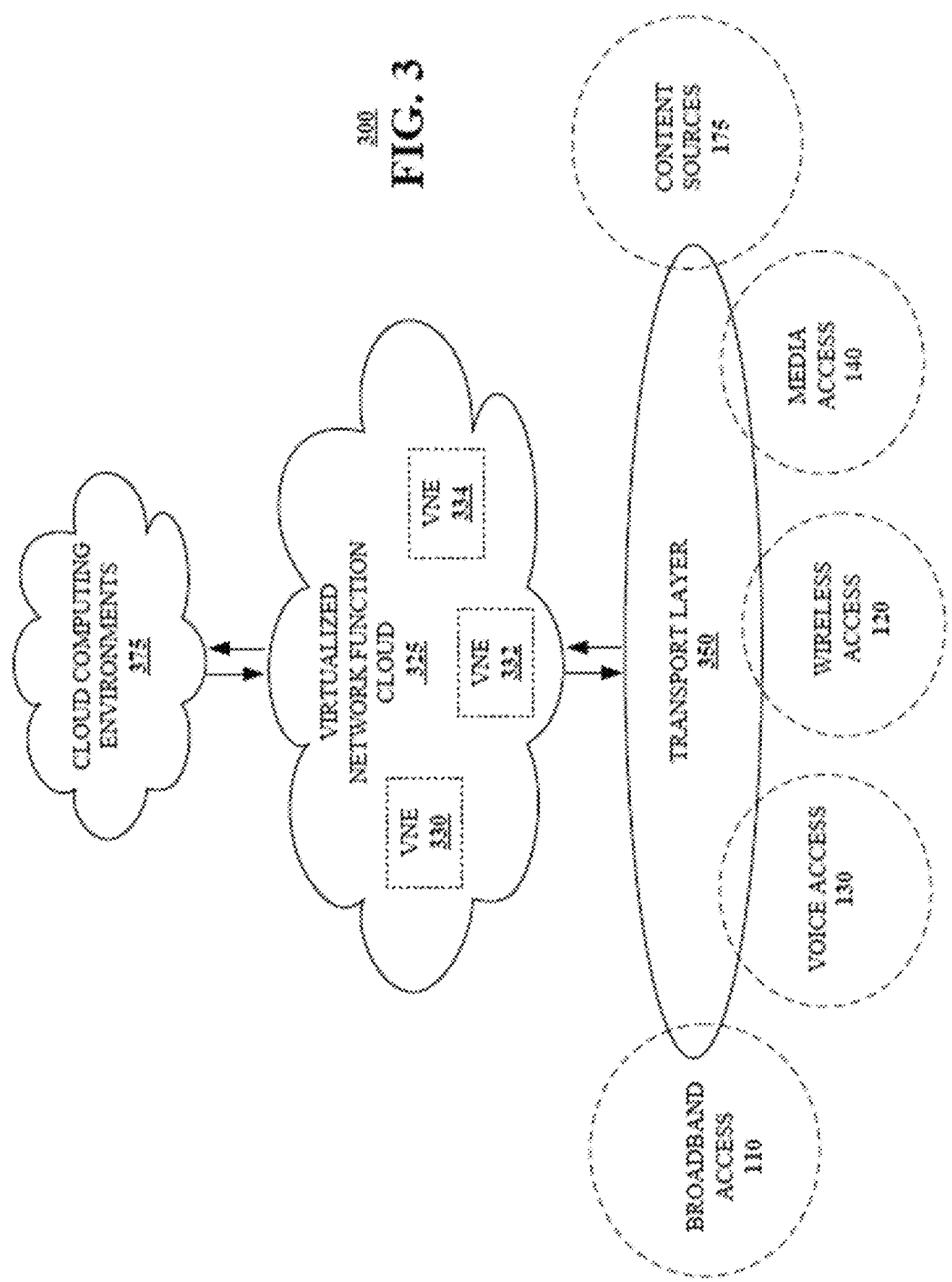
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc., that perform some or all of the functions of network elements 150, 152, 154, 156, etc., For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNE 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
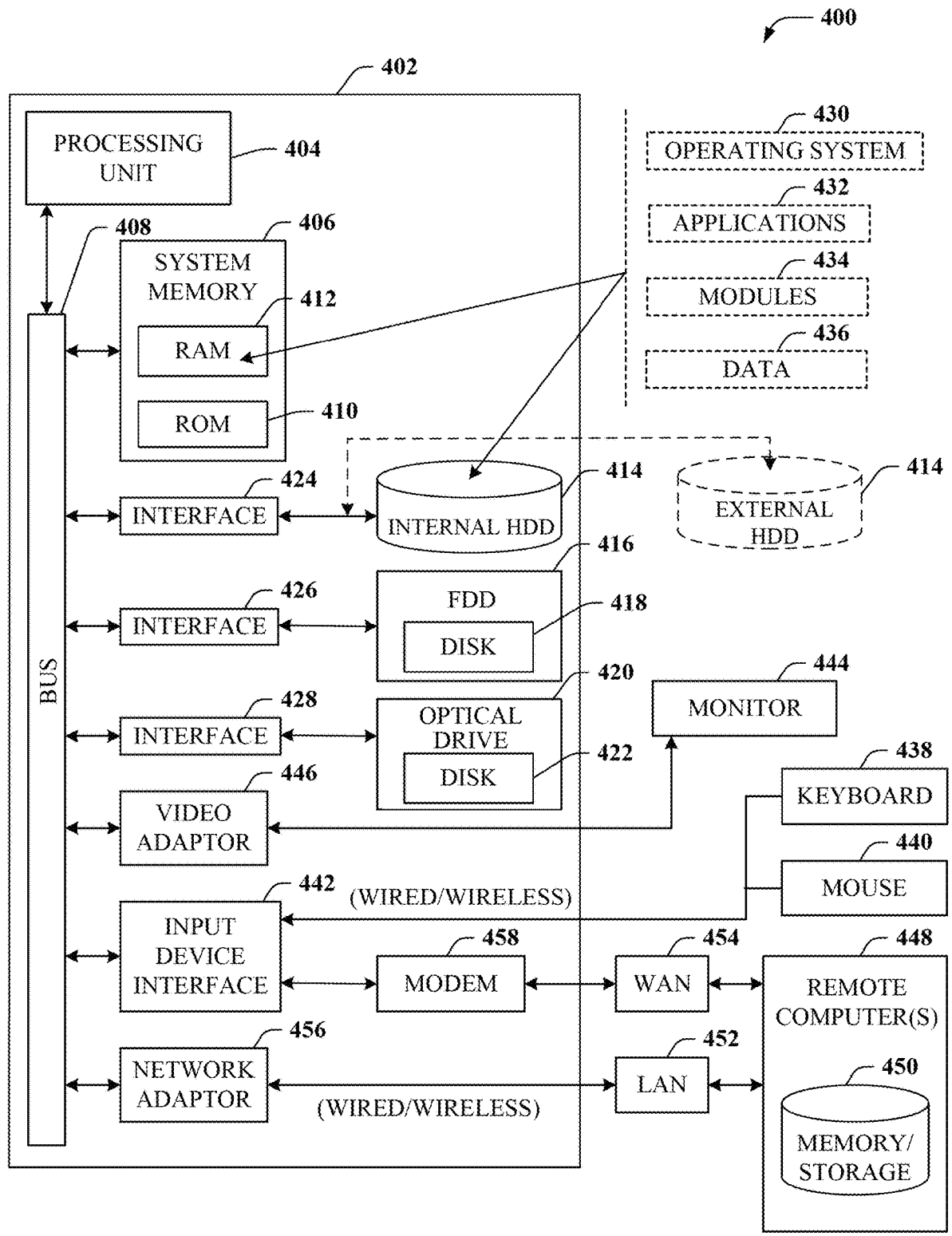
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
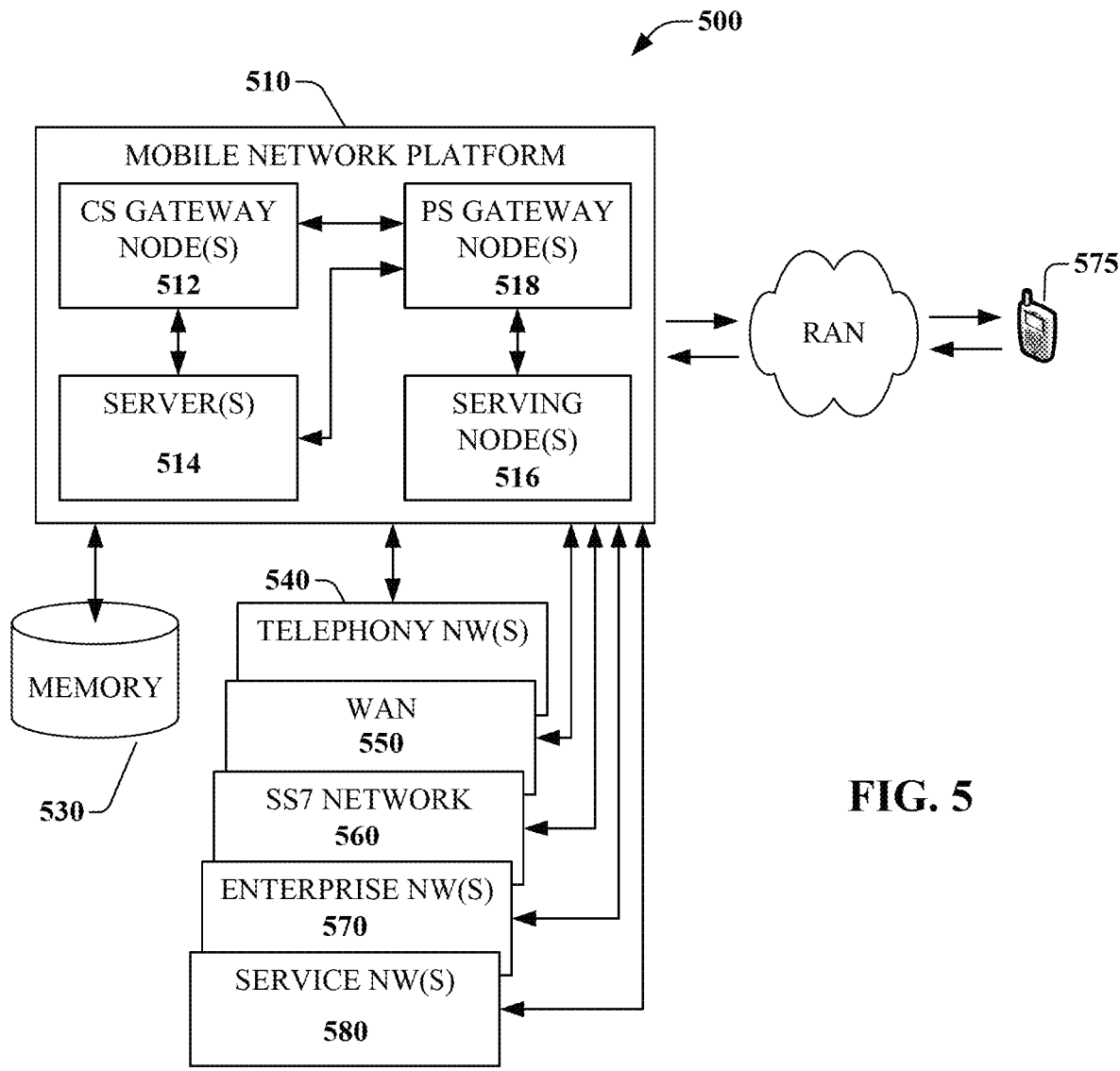
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
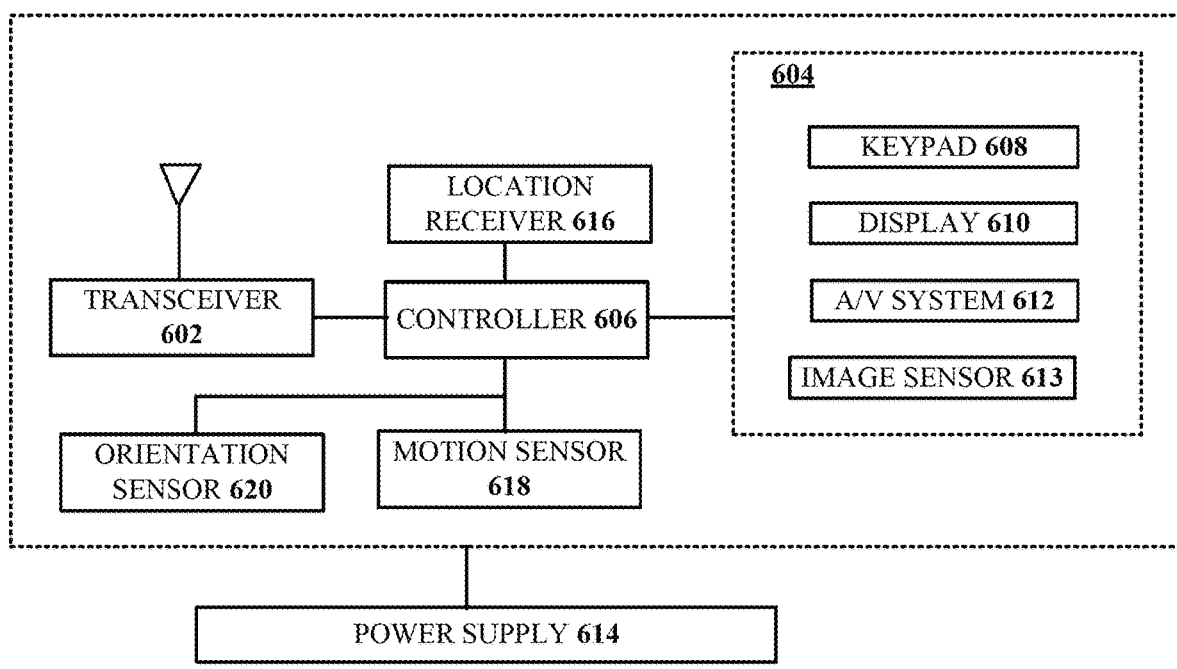
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
generating a plurality of content groups by grouping a plurality of segments of media content according to a plurality of segment lengths and according to a corresponding plurality of content designators;
detecting an activity of a user to obtain a detected activity, wherein the detected activity relates to movement of the user from a first geographic location to a second geographic location, wherein the detecting the activity involves determining, based on network activities generated by a target communication device of the user, whether the user is presently engaged in a business-related activity during the movement of the user from the first geographic location to the second geographic location, and wherein the target communication device is associated with a subscriber agreement involving a particular service provider;
determining a particular segment length of the plurality of segment lengths according to the detected activity, wherein the determining the particular segment length is based on a determined expected duration of travel of the user from the first geographic location to the second geographic location;
identifying that a second user, corresponding to a second communication device also associated with the subscriber agreement involving the particular service provider, is traveling with the user;
determining a particular content designator of the plurality of content designators according to the detected activity, wherein the determining the particular content designator of the plurality of content designators is further based on a determination that the user is not presently engaged in a business-related activity during the movement of the user from the first geographic location to the second geographic location, wherein the particular content designator is other than a content designator that corresponds to business-related content, wherein the plurality of content designators is based on at least one of media content type or media source, and wherein the determining the particular content designator of the plurality of content designators is further according to the identifying that the second user is traveling with the user, thereby providing a recommendation of content items of possible interest to both the user and the second user; and
generating a selected content group by selecting a content group from the plurality of content groups according to the particular segment length of the plurality of segment lengths and the particular content designator of the plurality of content designators, wherein information associated with the selected content group is provided to the target communication device of the user to enable the user to choose particular media content included in the selected content group and to consume the particular media content within the determined expected duration of travel of the user from the first geographic location to the second geographic location.

2. The device of claim 1, wherein the detected activity does not include media content consumption, wherein the media content type includes work-related, entertainment, news and sports, and wherein the operations further comprise:
obtaining a profile that is descriptive of the user;
generating, according to the profile, a request for media content; and
submitting the request to a plurality of media content sources.

3. The device of claim 1, wherein the plurality of segments of media content are received from a plurality of media content sources responsive to a search request initiated according to user-generated input associated with the user.

4. The device of claim 1, wherein the detecting the activity of the user is further based on calendar data identifying activities of the user, and wherein the determining the particular segment length of the plurality of segment lengths comprises determining a longer particular segment length if a quantity of activities of the user identified in the calendar data suggests a longer potential attention span of the user than if the quantity of activities of the user identified in the calendar data suggests a shorter potential attention span of the user.

5. The device of claim 1, wherein the plurality of segments of media content comprises audio content, video content, still image content, textual content, augmented reality content, virtual reality content, or any combinations thereof.

6. The device of claim 1, wherein the detecting the activity of the user is based on data selected from a group consisting of location data identifying a location of the user, movement data identifying a trajectory of the user, network data initiated by a device utilized by the user, orientation data provided by a communication device utilized by the user, calendar data identifying activities of the user, audio data generated from audible content obtained in a vicinity of the user, image data generated from image content obtained in the vicinity of the user, and any combinations thereof.

7. The device of claim 1, wherein the operations further comprise receiving user-generated input from the target communication device, and wherein the user-generated input is associated with a message associated with the selected content group, the message being presented to the targeted communication device.

8. The device of claim 7, wherein the operations further comprise initiating, according to the user-generated input, a presentation of media content from the selected content group.

9. The device of claim 8, wherein the presentation of media content is at a display device identified by the user-generated input.

10. The device of claim 9, wherein the display device is a component part of the target communication device.

11. The device of claim 7, wherein the operations further comprise recording at a recording device, responsive to the user-generated input, media content from the selected content group.

12. The device of claim 7, wherein the user-generated input comprises an audible signal obtained by the target communication device.

13. The device of claim 1, wherein the processing system is configured according to a plurality of selectable computing resources.

14. A non-transitory, machine-readable medium, comprising executable instructions that, when executed by a processing system including a processor, facilitate performance of operations, the operations comprising:
generating a plurality of content groups by grouping a plurality of segments of media content according to a plurality of segment lengths and according to a corresponding plurality of content designators;
detecting an activity of a user to obtain a detected activity, wherein the detected activity relates to movement of the user from a first geographic location to a second geographic location, wherein the detecting the activity involves determining, based on network activities generated by a target communication device of the user, whether the user is presently engaged in a business-related activity during the movement of the user from the first geographic location to the second geographic location, and wherein the target communication device is associated with a subscriber agreement involving a particular service provider;
determining a particular segment length of the plurality of segment lengths according to the detected activity, wherein the determining the particular segment length is based on a determined expected duration of travel of the user from the first geographic location to the second geographic location;
identifying that a second user, corresponding to a second communication device also associated with the subscriber agreement involving the particular service provider, is traveling with the user;
determining a particular content designator of the plurality of content designators according to the detected activity, wherein the determining the particular content designator is further based on a determination that the user is not presently engaged in a business-related activity during the movement of the user from the first geographic location to the second geographic location, wherein the particular content designator is other than a content designator that corresponds to business-related content, wherein the plurality of content designators is based on at least one of media content type or media source, and wherein the determining the particular content designator of the plurality of content designators is further according to the identifying that the second user is traveling with the user, thereby providing a recommendation of content items of possible interest to both the user and the second user;
generating a selected content group by selecting a content group from the plurality of content groups according to the particular segment length of the plurality of segment lengths and the particular content designator of the plurality of content designators; and
transmitting to the target communication device a notification associated with the selected content group to enable the user to choose particular media content included in the selected content group and to consume the particular media content within the determined expected duration of travel of the user from the first geographic location to the second geographic location.

15. The non-transitory, machine-readable medium of claim 14, wherein the detected activity does not include media content consumption, wherein the media content type includes work-related, entertainment, news and sports, wherein the notification includes media content obtained from the selected content group, wherein the detecting the activity of the user is further based on calendar data identifying activities of the user, and wherein the determining the particular segment length of the plurality of segment lengths comprises determining a longer particular segment length if a quantity of activities of the user identified in the calendar data suggests a longer potential attention span of the user than if the quantity of activities of the user identified in the calendar data suggests a shorter potential attention span of the user.

16. The non-transitory, machine-readable medium of claim 15, wherein the media content comprises audio content, video content, still image content, textual content, augmented reality content, virtual reality content, or any combinations thereof.

17. The non-transitory, machine-readable medium of claim 14, wherein the detecting the activity of the user is based on data selected from a group consisting of location data identifying a location of the user, movement data identifying a trajectory of the user, network data initiated by a device utilized by the user, orientation data provided by a communication device utilized by the user, calendar data identifying activities of the user, audio data generated from audible content obtained in a vicinity of the user, image data generated from image content obtained in the vicinity of the user, and any combinations thereof.

18. A method, comprising:
generating, by a processing system including a processor, a plurality of content groups by grouping a plurality of segments of media content according to a corresponding plurality of content designators and a plurality of segment lengths;
identifying, by the processing system, an activity of a user to obtain a detected activity, wherein the detected activity relates to travel of the user to a destination, wherein the identifying the activity involves identifying, based on network activities generated by a target communication device of the user, whether the user is presently engaged in a business-related activity during the travel of the user to the destination, and wherein the target communication device is associated with a subscriber agreement involving a particular service provider;
determining, by the processing system, a particular segment length of the plurality of segment lengths according to the detected activity, wherein the determining the particular segment length is based on a determined expected duration of travel of the user to the destination;
determining, by the processing system, that a second user, corresponding to a second communication device also associated with the subscriber agreement involving the particular service provider, is traveling with the user;
determining, by the processing system, a particular content designator of the plurality of content designators according to the detected activity, wherein the determining the particular content designator is further based on a determination that the user is not presently engaged in a business-related activity during the travel of the user to the destination, wherein the particular content designator is other than a content designator that corresponds to business-related content, wherein the plurality of content designators is based on at least one of media content type or media source, and wherein the determining the particular content designator of the plurality of content designators is further according to the determining that the second user is traveling with the user, thereby providing a recommendation of content items of possible interest to both the user and the second user;
generating, by the processing system, a selected content group by selecting a content group from the plurality of content groups according to the particular segment length of the plurality of segment lengths and the particular content designator of the plurality of content designators; and
transmitting, by the processing system, to the target communication device a notification associated with the selected content group to enable the user to choose particular media content included in the selected content group and to consume the particular media content within the determined expected duration of travel of the user to the destination.

19. The method of claim 18, wherein the detected activity does not include media content consumption, wherein the media content type includes work-related, entertainment, news and sports, wherein the method further comprises receiving, by the processing system and responsive to the notification, a request to obtain certain media content from the selected content group, wherein the certain media content comprises audio content, video content, still image content, textual content, augmented reality content, virtual reality content, or any combinations thereof, wherein the identifying the activity of the user is further based on calendar data identifying activities of the user, and wherein the determining the particular segment length of the plurality of segment lengths comprises determining a longer particular segment length if a quantity of activities of the user identified in the calendar data suggests a longer potential attention span of the user than if the quantity of activities of the user identified in the calendar data suggests a shorter potential attention span of the user.

20. The method of claim 18, wherein the identifying of the activity is according to activity data that comprises location data identifying a location of the user, movement data identifying a trajectory of the user, network data initiated by a device utilized by the user, orientation data provided by a communication device utilized by the user, calendar data identifying activities of the user, audio data generated from audible content obtained in a vicinity of the user, image data generated from image content obtained in the vicinity of the user, or any combinations thereof.

* * * * *